(12) United States Patent
Hayakawa et al.

(10) Patent No.: US 6,334,952 B1
(45) Date of Patent: Jan. 1, 2002

(54) COAGULATING SEDIMENTATION APPARATUS

(75) Inventors: Minoru Hayakawa; Toshihiko Abe, both of Tokyo (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/583,919

(22) Filed: May 31, 2000

(30) Foreign Application Priority Data

| May 31, 1999 | (JP) | 11-152629 |
| Jul. 13, 1999 | (JP) | 11-199134 |
| Apr. 6, 2000 | (JP) | 12-105228 |

(51) Int. Cl.[7] .................... B01D 21/08; B01D 21/24
(52) U.S. Cl. .............. 210/208; 210/520; 210/523; 210/528
(58) Field of Search .................. 210/207, 208, 210/519, 520, 521, 523, 528

(56) References Cited

U.S. PATENT DOCUMENTS

| 2,348,123 A | * | 5/1944 | Green et al. ............ 210/208 |
| 2,787,378 A | * | 4/1957 | Battey .................... 210/520 |
| 3,521,755 A | * | 7/1970 | Bowman ................. 210/520 |
| 3,525,439 A | * | 8/1970 | Spragins ................. 210/520 |
| 4,278,541 A | * | 7/1981 | Eis ......................... 210/528 |
| 4,303,517 A | * | 12/1981 | Love et al. ............. 210/528 |
| 5,478,468 A | | 12/1995 | Deno et al. ............ 210/208 |

FOREIGN PATENT DOCUMENTS

| DE | 1015411 | 9/1957 |
| JP | 58174209 A | 10/1983 |
| JP | 1-38523 | 8/1989 |

* cited by examiner

Primary Examiner—Christopher Upton
(74) Attorney, Agent, or Firm—Arent Fox Kintner Plotkin & Kahn, PLLC

(57) ABSTRACT

A sedimentation apparatus for precipitating and separating suspended solids and coagulated flocs in a liquid to be treated, so as to clarify the liquid. The sedimentation apparatus comprises a mixing chamber secured within a sedimentation tank, for mixing and stirring the liquid and an additive; and a rotary support of a distributor, functioning as a bottom of the mixing chamber, rotatable about the center axis of the mixing chamber. The bottom portion of the rotary support is formed with an opening. The sedimentation apparatus has a blade for discharging from the opening the precipitate deposited on the bottom of the rotary support. As a consequence, the precipitate can be prevented from accumulating in excess in the rotary support.

14 Claims, 8 Drawing Sheets

COAGULATING SEDIMENTATION APPARATUS

BACKGROUND OF THE INVENTION

1. Field of the Invention

The present invention relates to a sedimentation apparatus for coagulating and precipitating suspended solids or the like in a liquid to be treated within a sedimentation tank, so as to clarify the liquid.

2. Related Background Art

Coagulating sedimentation apparatus are a kind of sedimentation type water treatment apparatus, which flocculate suspended solids or the like contained in a liquid to be treated such as raw wastewater by coagulating it with an appropriate additive, thereby eliminating the suspended solids from the liquid by sedimentation operation.

As this kind of sedimentation apparatus, one disclosed in Japanese Patent Publication No. HEI 1-38523 has been known. The sedimentation apparatus described in the publication, includes a tubular mixing chamber for coagulating the suspended solids or the like by mixing the liquid to be treated with an additive. The mixing chamber is disposed in an upright state within a sedimentation tank at the center thereof. Also, a distributor is disposed at the lower end of the mixing chamber, by which the liquid to be treated having coagulated flocs is distributed into the inner space within the tank. In this specification, the inner space excludes the space within the mixing chamber, hereinafter referred to as "sedimentation space".

A distributor developed in recent years is basically constituted by a cup-shaped rotary support, connected to a lower portion of a center shaft disposed within the mixing chamber concentrically therewith, functioning as a bottom of the mixing chamber; a plurality of discharge pipes radially extending from the outer peripheral surface of the rotary support; and a driving device for rotating the center shaft. When the center shaft is rotated, the floc-containing liquid to be treated is discharged from discharge orifices of the individual discharge pipes and is evenly distributed into the sedimentation space within the sedimentation tank.

In the sedimentation space, the coagulated floc in the liquid is separated by sedimentation operation and forms a concentrated sludge layer at the bottom region of the tank. On the other hand, clear supernatants ascend to the upper region of the tank, and a very clear supernatant near the liquid surface is collected by a trough disposed at the upper region of the tank and is taken out of the tank through an outlet communicating with this trough.

The above-mentioned conventional sedimentation apparatus can efficiently yield clarified supernatants and are used for various purposes, e.g., for treating wastewater, collecting papermaking white water, and so forth. However, as sedimentation apparatus of this type have come into wider use, the following problems have been noticed.

In the typical sedimentation apparatus, the liquid to be treated is continuously introduced into an upper portion of the mixing chamber through a conduit; whereas the liquid within the mixing chamber is discharged from the rotating distributor below the mixing chamber. Meanwhile, the liquid within the mixing chamber contains particles having a relatively high specific gravity, and suspended solids or the like which coagulates and forms bulky flocs within a short period of time under the action of an additive.

As a consequence, the particles and flocs may sediment within the mixing chamber to directly accumulate within the rotary support of the distributor, which functions as the bottom of the mixing chamber, before flowing into the discharge pipes from the mixing chamber. If sludge or the like accumulates within the rotary support or the bottom of the mixing chamber, the discharge pipe inlets in the distributor may be blocked. If the discharge pipe inlets are blocked, then the liquid to be treated cannot efficiently be distributed into the sedimentation space in the tank, whereby clarity of supernatants may deteriorate.

Therefore, it is an object of the present invention to provide a coagulating sedimentation apparatus having a favorable operating performance and yielding extremely clarified supernatants.

SUMMARY OF THE INVENTION

For achieving the above-mentioned object, the present invention provides a coagulating sedimentation apparatus for precipitating and separating suspended solids, coagulated flocs or the like in a liquid to be treated, so as to clarify the liquid, the sedimentation apparatus comprising: a sedimentation tank; a mixing chamber disposed in an upright state within the tank concentrically therewith, for introducing, stirring and mixing the liquid and an additive therein; a cup-shaped rotary support disposed adjacent a lower end part of the mixing chamber so as to act as a bottom of the mixing chamber, the rotary support being adapted to rotate about a center axis of the mixing chamber and having a bottom portion formed with an opening; a discharge pipe extending outward from an outer peripheral surface of the rotary support, communicating with the inside of the rotary support, and having a tubular wall provided with a discharge orifice, for distributing the liquid within the mixing chamber into a precipitation space between the tank and the mixing chamber; and a blade fixed with respect to the mixing chamber and adapted to discharge a precipitate deposited on the bottom portion of the rotary support from the opening to the outside of the rotary support.

Various liquids to be treated in the sedimentation apparatus include particles having a relatively heavy weight, and suspended solids or the like which coagulates within a short period of time under the action of an additive, thereby forming bulky flocs. As a consequence, the particles and bulky flocs or the like may separating within the mixing chamber, thereby precipitating at the bottom of the rotary support without flowing into the discharge pipe of the distributor. In view of this point, the bottom portion of the rotary support in this sedimentation apparatus is formed with an opening, whereas a scraping blade is fixed with respect to the mixing chamber.

Namely, during the operation of the sedimentation apparatus, the rotary support rotates relative to the mixing chamber, whereby the scraping blade fixed to the mixing chamber pivots with respect to the rotary support. As a consequence, the precipitate deposited on the bottom of the rotary support during the operation of the sedimentation apparatus is scraped into the opening by the scraping blade, and is discharged into the tank by way of the opening. As a result, the inlet of the discharge pipe is prevented from being blocked, so that the liquid to be treated is always efficiently distributed into the tank. Hence, the operating performance of the sedimentation apparatus improves, and the clarity of supernatants also increases.

The present invention will be more fully understood from the detailed description given hereinbelow and the attached drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

In the course of the following detailed description, reference will be made to the attached drawings in which.

DESCRIPTION OF THE PREFERRED EMBODIMENTS

Figure 1:
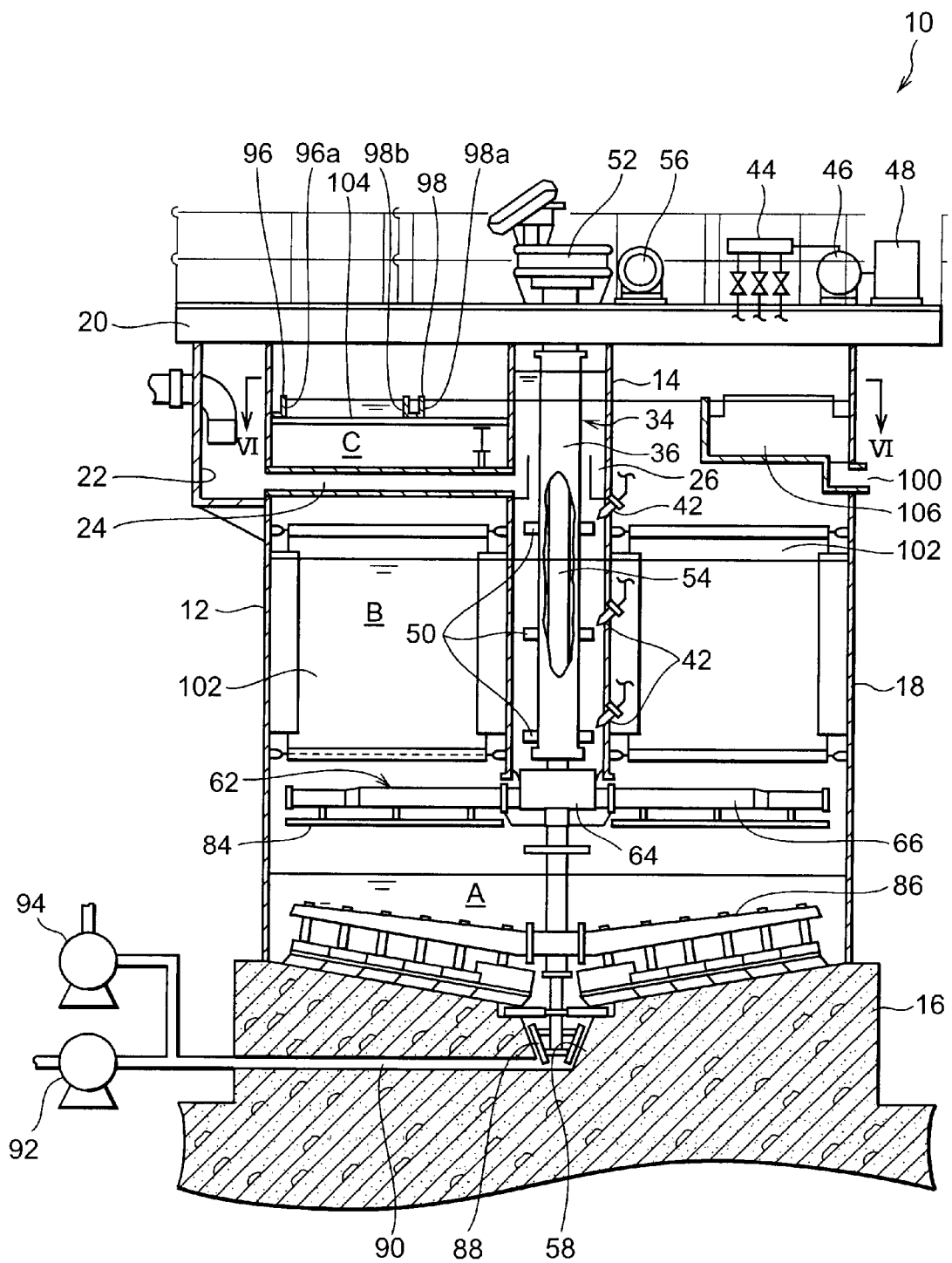
FIG. 1 is a vertical sectional view showing a sedimentation apparatus in accordance with the present invention.

Referring now to the drawings, and particularly, to FIG. 1, there is shown vertical sectional view of a coagulating sedimentation apparatus in accordance with the present invention, being generally designated by numeral 10 The sedimentation apparatus 10 is of a type comprising a sedimentation tank 12 adapted to separate suspended solids and flocs from a liquid to be treated such as row wastewater by sedimentation operation and take out a clarified supernatant as a treated liquid; and a mixing chamber 14, disposed therewithin, for coagulating the suspended solids and the like in the liquid and flocculating them. Such a sedimentation apparatus 10 is capable of so-called sludge blanket type operation and slurry circulation type operation, and can be employed for various purposes, e.g., for treating wastewater, collecting papermaking white water, collecting DIP wastewater, clarifying caustic green liquor, treating water, treatment for precipitating and washing inorganic substances, and the like.

The sedimentation tank 12 has a depth of about 4000 to 5000 mm and a diameter of about 1500 to 30000 mm, which are set arbitrarily according to the space for installing the tank 12 and the property, amount and etc. of the liquid to be treated. The sedimentation tank 12 is constructed by a base 16 made of concrete or the like disposed in the area for installing the sedimentation apparatus 10 and a side wall 18, fixed thereon, which is made of a steel plate.

A frame 20 bridges over the upper edge portion of the tank side wall 18. The frame 20 is mainly used as a service space for operators. The mixing chamber 14 is vertically suspended from the center portion of the frame 20. The mixing chamber 14 is substantially shaped like an elongated cylinder and has, for example, a total length of about ⅔ of the depth of the sedimentation tank 12. The mixing chamber 14 is fixed to the frame 20 such that its center axis aligns with that of the sedimentation tank 12. As a consequence, the mixing chamber 14 is secured within the sedimentation tank 12 in an upright state, while a predetermined gap or space is formed between the lower end of the mixing chamber 14 and the bottom surface of the sedimentation tank 12.

A liquid inlet pipe 22 extends from a pump (not shown) disposed outside the sedimentation tank 12. A conduit 24 for introducing the liquid to be treated is connected to the upper portion of the mixing chamber 14, and communicates with the liquid inlet pipe 22. The position at which the conduit 24 and the mixing chamber 14 connect with each other is lower than the liquid surface in the sedimentation space within the tank 12 and the liquid surface within the mixing chamber 14 during the operation.

Figure 2:
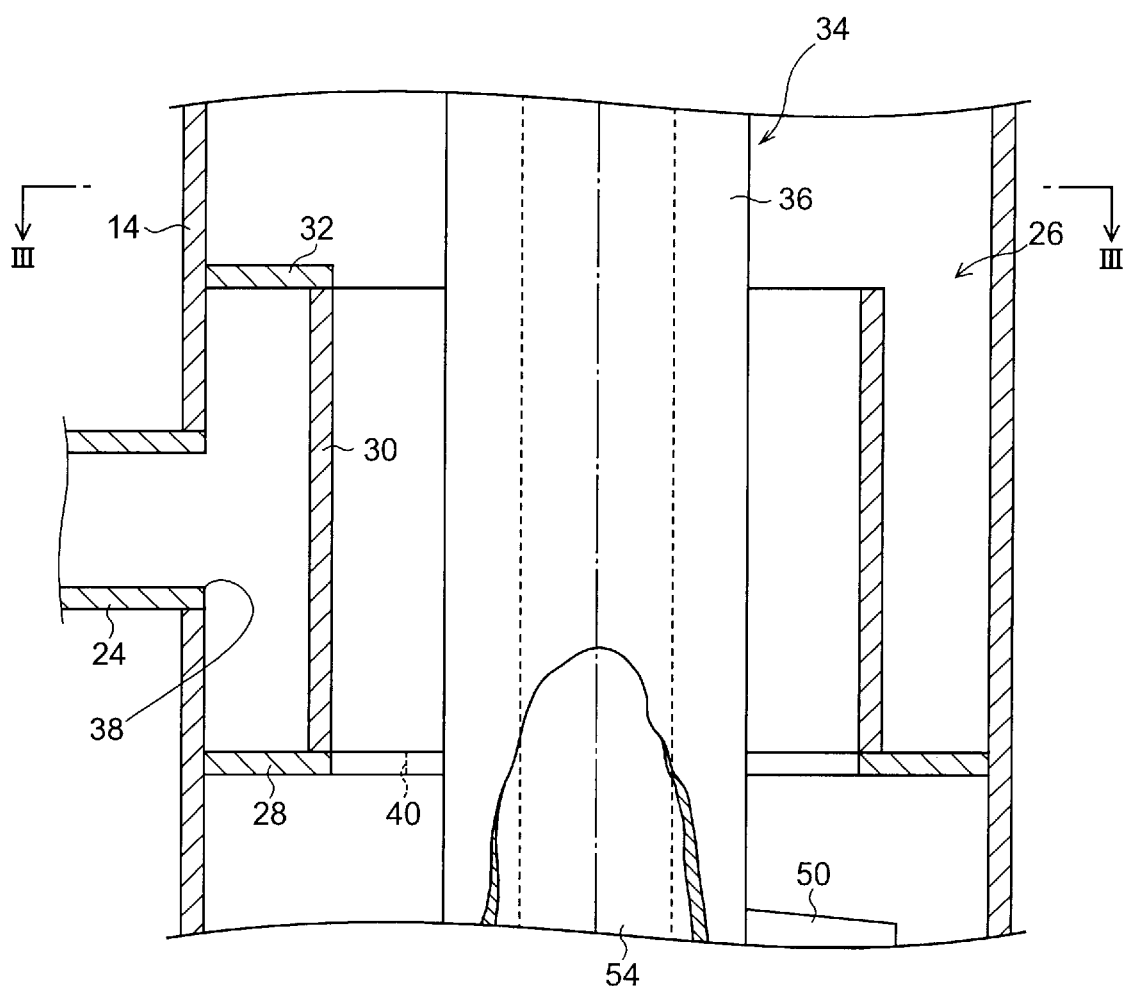
FIG. 2 is an enlarged partial sectional view showing the vicinity of a connecting part between a mixing chamber and a conduit for introducing a liquid to be treated.

Within the mixing chamber 14, as shown in FIG. 2, a receiving chamber 26 directly communicating with the liquid introducing conduit 24 is disposed. The receiving chamber 26 is defined by an annular member 28 made of an annular flat plate and a tubular member 30. The annular member 28 forms the bottom part of the receiving chamber 26, whereas the tubular member 30 forms the side wall part of the receiving chamber 26.

A space for receiving the target liquid is defined among the annular member 28, the tubular member 30 and the inner peripheral surface of the mixing chamber 14. The sizes of the annular member 28 and tubular member 30 are set such that the volume of this space is necessary and sufficient. Also, the annular member 28 is secured on the inner peripheral face of the mixing chamber 14 so as to be positioned lower than the conduit 24. Further, the upper edge portion of the tubular member 30 fixed to the inner peripheral edge of the annular member 28 is positioned higher than the conduit 24. As a consequence, when flowing into the mixing chamber 14, the liquid to be treated reliably circulates through the receiving chamber 26 at first.

Figure 3:
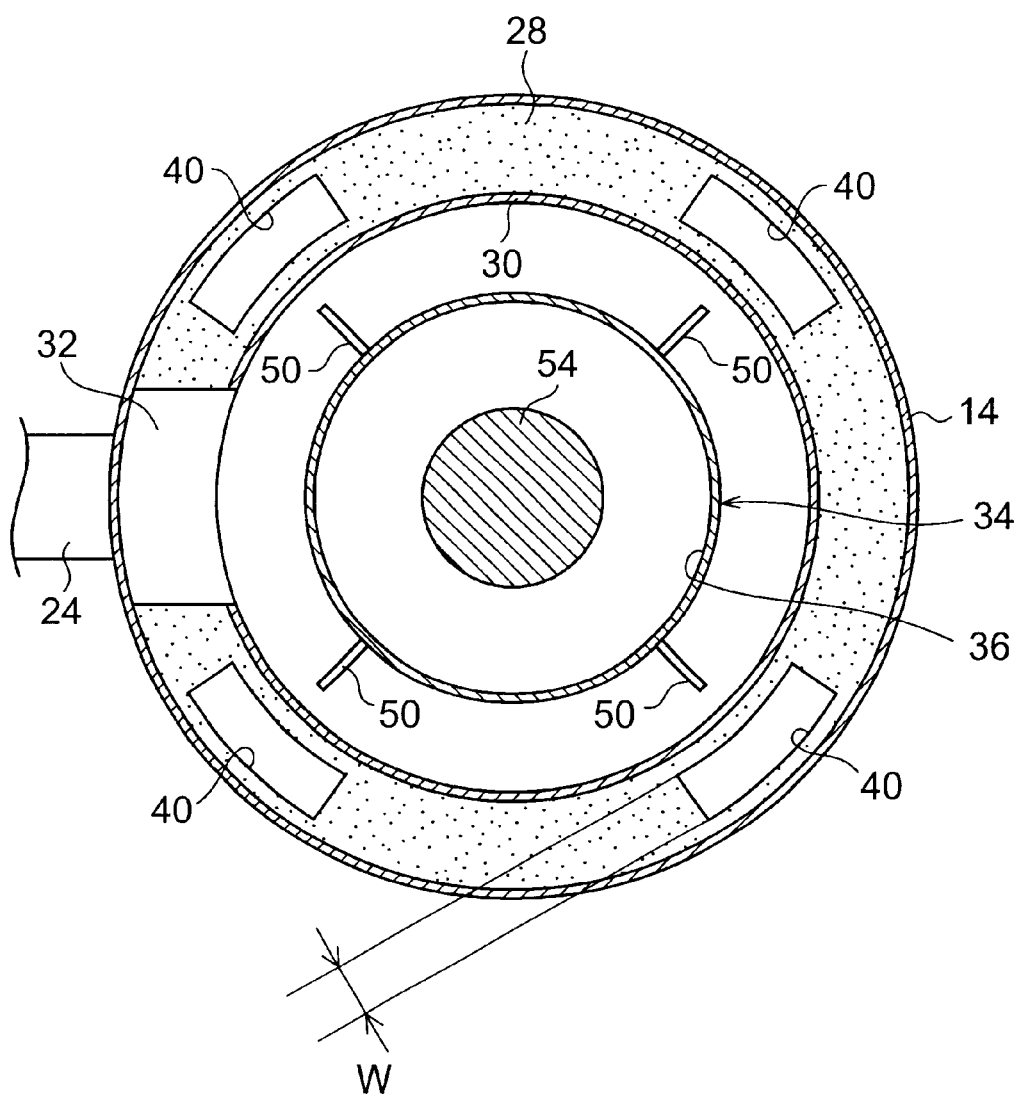
FIG. 3 is a sectional view taken along the line III—III in FIG. 2.

In addition, in the vicinity of the conduit 24, an overflow stopper 32 is disposed between the inner peripheral face of the mixing chamber 14 and the upper edge portion of the tubular member 30. Consequently, even when the flow rate of the liquid flowing from the conduit 24 into the receiving chamber 26 is high, the liquid can be prevented from immediately spilling out of the receiving chamber 26 in the vicinity of the conduit 24. Here, as shown in FIGS. 2 and 3, a tubular body 36 of a mixer device 34, which will be explained later, can be installed inside the tubular member 30. This arrangement aims at effectively utilizing the space within the mixing chamber 14.

Thus, when the receiving chamber 26 is disposed within the mixing chamber 14, the liquid flowing out of the conduit 24 circulates through the receiving chamber 26 and then flows into the mixing chamber 14. As a result, even if the liquid introduced into the mixing chamber 14 contains particles having a relatively high specific gravity, bulky flocs, and the like, the amount of precipitate at the bottom of the mixing chamber 14 can effectively be reduced as compared with the case without the receiving chamber 26.

Depending on the property of the liquid to be treated and the like, however, the amount of precipitate on the bottom part 28 of the receiving chamber 26 may be so much that the outlet 38 of the conduit 24 may be blocked in some cases.

Hence, as clearly shown in FIG. 3, the annular member 28 is formed with discharge ports 40 for discharging the precipitate deposited within the receiving chamber 26 into the mixing chamber 14. In the shown embodiment, the discharge ports 40 are disposed at four places in total at 90° intervals. In this case, the total area of the discharge ports 40 (the total of the individual areas of discharge ports 40) is preferably ¼ to ½ of the area of the chamber bottom part 28. This can prevent the liquid having flowed into the receiving chamber 26 from flowing into the mixing chamber 14 in excess from the discharge ports 40, and also can prevent the discharge ports 40 from being blocked with the precipitate. For preventing the discharge ports 40 from being blocked with the precipitate, their opening width (indicated by W in FIG. 3) is preferably set to 30 mm or greater.

If the annular member 28 is provided with the discharge ports 40, then particles having a high specific gravity, bulky flocs, and the like contained in the liquid to be treated within the receiving chamber 26 will sediment into the mixing chamber 14 by way of the discharge ports 40, and the precipitate on the annular member 28 will be discharged into the mixing chamber 14 by way of the discharge ports 40 due to the flow within the receiving chamber 26. As a consequence, there will occur no troubles such as the blocking of the outlet 38 of the conduit 24.

Referring to FIG. 1 again, the mixing chamber 14 is provided with a plurality of injection nozzles 42 for injecting various additives which coagulate suspended solids and the like in the liquid to be treated and form flocs. While a high-molecular coagulant is employed as an additive to be introduced into the mixture chamber 14, it is appropriately selected depending on the liquid to be treated and the materials contained therein as a matter of course. The individual injection nozzles 42 are disposed along the vertical axis of the mixing chamber 14. In this embodiment, a pair of injection nozzles 42 are disposed in each of the upper, middle, and lower stages of the mixing chamber 14. Each injection nozzle is connected to a pump 46 by way of a header 44 supported by an appropriate support, for example, such as the frame 20, whereas a tank 48 containing an additive is connected to the suction port of the pump 46. Therefore, when the pump 46 is driven, the additive will be injected into the mixing chamber 14 from the tank 48 by way of the injection nozzles 42. The amount of injection of the additive is controllable for each injection nozzle 42.

Further, as shown in FIG. 1, the mixing chamber incorporates therein the mixer device 34 for mixing and stirring the liquid to be treated and the additive. The mixer device 34 is constituted by the hollow tubular body 36 vertically hung from the frame 20 with an upper end portion thereof rotatably supported in the frame 20 so as to be concentric with the mixing chamber 14, and a plurality of blades 50 attached to the outer peripheral face thereof. Also, at the time of operation of the sedimentation apparatus 10, the mixer tubular body 36 is rotated by a driving device 52 mounted on the frame 20.

A center shaft 54 is inserted through the mixer tubular body 36. The center shaft 54 is also rotatably hung from the frame 20 while in a state disposed concentric with the mixing chamber 14, and is rotated by a driving device 56 mounted on the frame 20. The center shaft 54 vertically extends to a sludge drain recess 58 disposed at the center part of the concrete base 16. Also, as clearly shown in FIG. 4, a plurality of members 60 for suppressing axial fluctuations of the center shaft 54 are fixed to the lower end part of the mixer tubular body 36, for example, at 90° intervals.

The portion of center shaft 54 adjacent the lower end of the mixing chamber 14 is provided with a distributor 62 for distributing the liquid in the mixing chamber 14 into the sedimentation tank 12. As can be understood from FIG. 4, the distributor 62 is basically constituted by a cup-shaped rotary support 64 concentrically fixed to the center shaft 54 and disposed so as to close the lower end portion of the mixing chamber 14, and a plurality of discharge pipes 66 communicating with the inside of the rotary support 64 and horizontally extending radially outward from the outer peripheral surface of the rotary support 64. Each discharge pipe 66 is formed with a row of a plurality of discharge orifices 68 along the longitudinal axis thereof. At the time of operation of the sedimentation apparatus 10, the distributor 62 is rotated by the driving device 56 together with the center shaft 54, whereby the liquid containing coagulated flocs within the mixing chamber 14 is discharged and distributed into the sedimentation tank 12 while drawing a circle from the discharge orifices of the discharge pipes 66.

A sealing unit 70 is disposed between the gap between the mixing chamber 14 and the rotary support 64. The sealing unit 70 is constituted by a twofold sheet-like packing 72 fixed to the flange portion formed at the lower edge of the mixing chamber 14, such that the packing 72 slides against the outer peripheral surface of the upper portion of the rotary support 64. This prevents the liquid from being discharged or taking a shortcut directly into the sedimentation space within the tank 12. As a matter of course, a molded packing having a P-shaped cross section may be used in place of the packing 72, and the sealing unit 70 may also be constituted as a gland packing or mechanical seal.

The rotary support 64 of the distributor 62 functions as the bottom of the mixing chamber 14. Consequently, particles having a relatively high specific gravity, bulky flocs, and the like in the liquid to be treated may sediment within the mixing chamber 14 and accumulate on the bottom surface of the rotary support 64 without flowing into the discharge pipes 66. Here, the particles having a high specific gravity and the bulky flocs include those having flowed out of the receiving chamber 26 into the mixing chamber 14. The bulky flocs further include suspended solids and the like coagulated within a short period of time upon addition of the additive into the liquid. If sludge and the like precipitate on the bottom surface of the rotary support 64 in excess as such, then there is a possibility of the precipitate entering between the center shaft 54 and the members 60 for suppressing the axial fluctuations, thereby wearing and damaging the center shaft 54 and the members 60 or blocking the discharge pipes 66.

Figure 5:
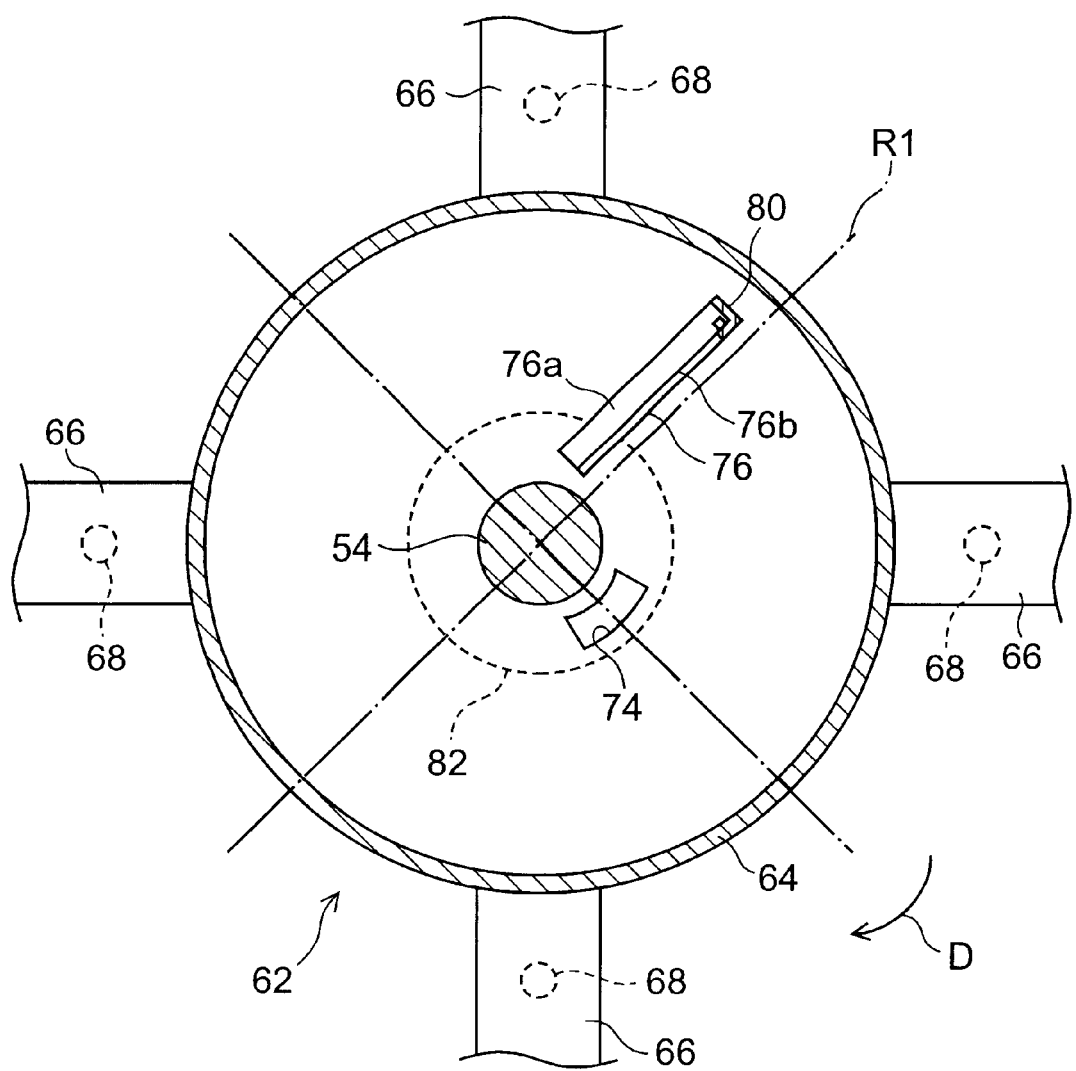
FIG. 5 is a sectional view taken along the line V—V in FIG. 4.

In view of this point, as shown in FIG. 5, the bottom of the rotary support 64 is formed with an opening 74 for discharging the precipitate such as sludge into the sedimentation space within the tank 12. In the depicted sedimentation apparatus 10, one opening 74 is disposed in the vicinity of the center shaft 54.

Figure 4:
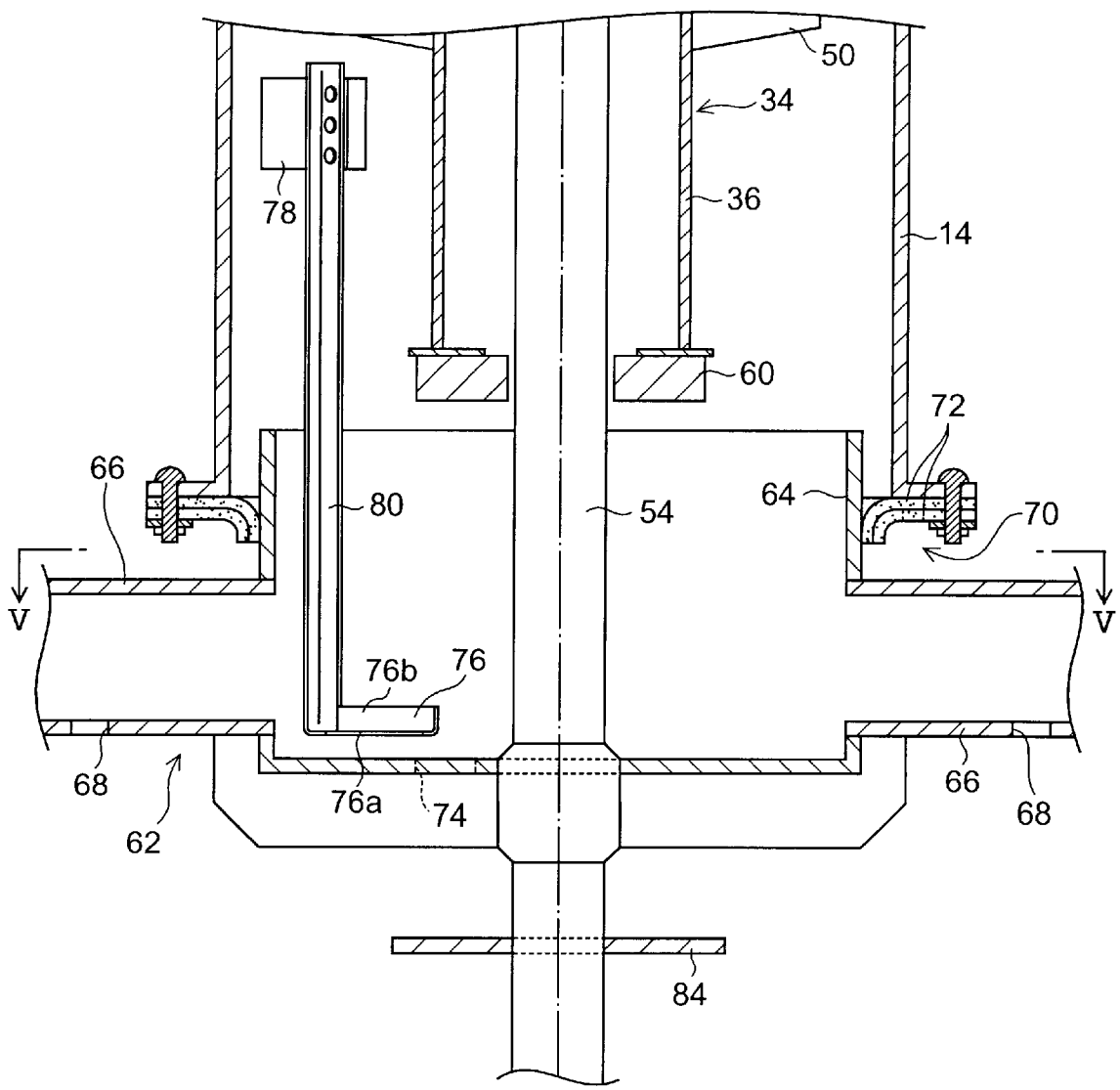
FIG. 4 is an enlarged partial sectional view showing the vicinity of a connecting part between the mixing chamber and a rotary support.

Also, as shown in FIGS. 4 and 5, the mixing chamber 14 is formed with a scraping blade 76 for scraping the precipitate deposited on the bottom surface of the rotary support 64 into the opening 74 and discharging it into the sedimentation space therefrom. More specifically, an attachment block 78 is fixed to the inner peripheral surface of the lower portion of the mixing chamber 14, whereas the upper end of a support member 80 made of an angle steel or the like is fixed to the attachment block 78 with the aid of a bolt or the like. The support member 80 extends in parallel with the center shaft 54, i.e., vertically. The scraping blade 76 is fixed to the lower end portion of the support member 80 so as to extend inward substantially in a horizontal direction. The scraping blade 76 is an angle steel constituted by a pair of planar parts 76a, 76b connected to each other at right angles and has substantially an L-shaped cross section. One planar part 76a is substantially parallel to the bottom surface of the rotary support 64, whereas the other planar part 76b extends upward in a substantially vertical direction. Also, the vertical planar part 76b is located on the front side in the normal rotating direction of the rotary support 64 (indicated by the arrow of D in FIG. 5). Preferably, the distance between the horizontal planar part 76a of the scraping blade 76 and the bottom surface of the rotary support 64 is set to about 1 to 50 mm.

Here, when a line which is substantially parallel to the scraping blade 76 and radially extends from the center of the center shaft 54 is arbitrarily chosen and set as a specific radius R1, the scraping blade 76 as a whole is disposed so as to be positioned parallel to the radius R1 and on the reverse direction side of the rotary support 64 from the radius R1. Since the scraping blade 76 is disposed as such, a centripetal force (directed to the center shaft 54) would act on the precipitate in contact with the vertical planar part 76b of the scraping blade 76. As a consequence, when the scraping blade 76 rotates with respect to the rotary support 64, then the precipitate will be scraped by the scraping blade 76 toward the center shaft 54.

Within the sedimentation tank 12, a shortcut preventing member 82 for blocking the flow of the liquid to be treated flowing out into the sedimentation space within the tank 12 through the opening 74 is disposed under the rotary support 64. As shown in FIGS. 4 and 5, the shortcut preventing member 82 is shaped like a disk and is fixed to the center shaft 54 such that its outer periphery is located on the outside of the outer edge of the opening 74. As the center shaft 54 rotates, the shortcut preventing member 82 rotates together with the rotary support 64.

Returning to FIG. 1, baffle plates 84 located under their corresponding discharge pipes 66 of the distributor 62 are attached to the rotary support 64. As a consequence, the liquid discharged from the discharge orifices 68 is deflected by the baffle plates 84 and then is supplied to the lower region of the sedimentation tank 12, so that the coagulated flocs are restrained from being stirred by the liquid discharged from the distributor 62, whereby the efficiency of separation by sedimentation further improves in the sedimentation apparatus 10. Here, since there is a risk of swirls occurring in excess within the sedimentation tank 12 if the diameter of the discharge pipes 66 is too large, the discharge pipes 66 are preferably made with a small diameter. If the sedimentation tank 12 has a large diameter, then the number of discharge pipes 66 is preferably increased according to the diameter.

Further attached to the lower end portion of the center shaft 54 are a rake 86 and a cone scraper 88 which rotate together with the distributor 62. The rake 86 is used for concentrating the sludge formed by sedimented flocs in the liquid discharged from the discharge pipes 66 and scraping the sludge into the sludge drain recess 58. The cone scraper 88 is disposed within the recess 58. The recess 58 communicates with a sludge drain pipe 90 penetrating through the concrete base 16, whereas the sludge drain pipe 90 is connected to a sludge drain pump 92 and a sludge return pump 94. Upon a sludge blanket operation, the sludge drain pump 92 is actuated according to the value indicated by an interface sensor (not shown), so as to discharge the concentrated sludge within the sedimentation tank 12 to the outside of the system, thereby keeping the interface level of the sludge blanket layer within a predetermined range. Here, since the cone scraper 88 is rotating, the concentrated sludge within the sedimentation tank 12 is discharged evenly. Upon a slurry circulation operation, on the other hand, the sludge return pump 94 is actuated according to the value indicated by the interface sensor, so as to appropriately return the sludge into the sedimentation tank 12.

Figure 6:
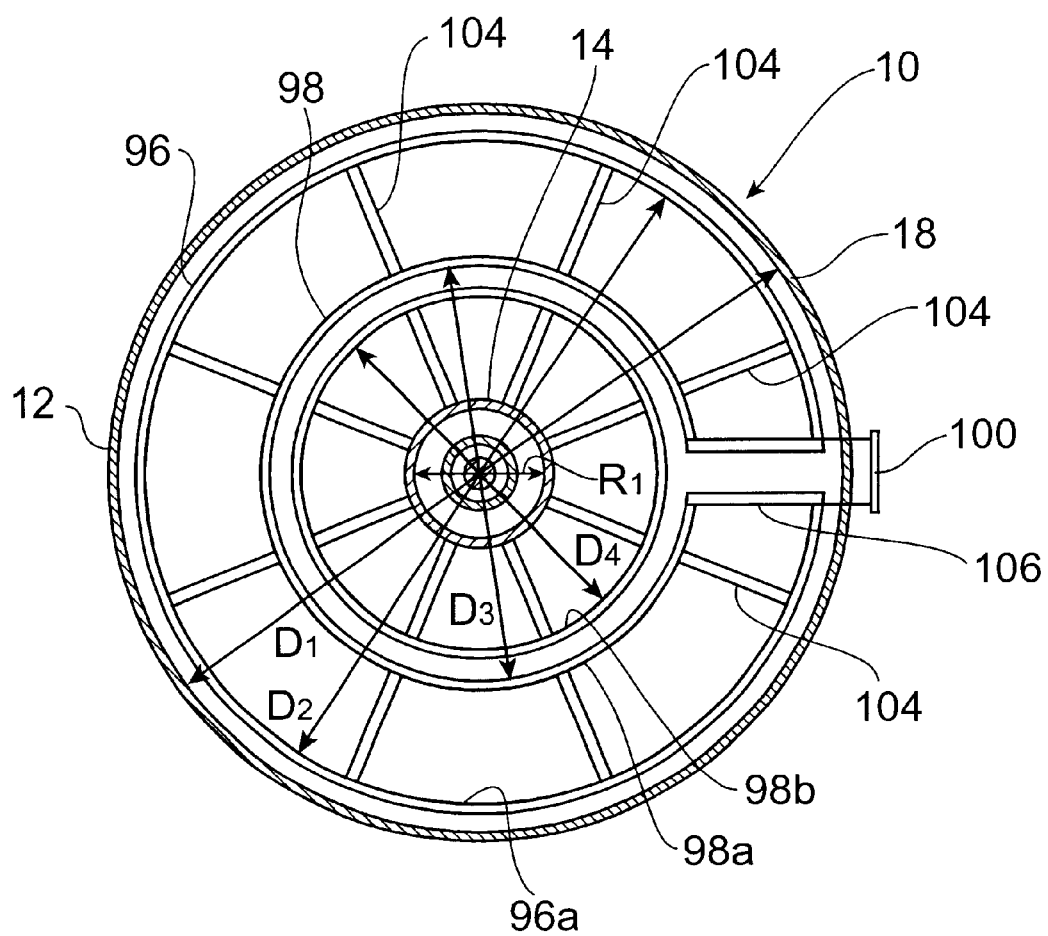
FIG. 6 is a sectional view taken along the line VI—VI in FIG. 1.

Disposed in the upper portion of the sedimentation tank 12 are annular troughs 96, 98 for collecting the clarified liquid, which is supplied from the distributor 62 into the sedimentation space and increases therein. In the shown embodiment, there are two annular troughs 96, 98 having larger and smaller diameters, which are disposed concentrically as clearly shown in FIG. 6. The annular troughs 96, 98 communicate with a flow outlet 100 formed in the upper portion of the side wall 18 of the sedimentation tank 12. The annular troughs 96, 98 will be explained in further detail in the following.

With the foregoing arrangement, the liquid to be treated such as raw water will be clarified as follows.

The target liquid such as raw water is supplied to the sedimentation apparatus 10 by way of the inlet pipe 22. The liquid flowing through the inlet pipe 22 by way of the conduit 24 initially flows into the receiving chamber 26. Subsequently, the liquid circulates through the space defined by the annular member 28, tubular member 30, and inner peripheral surface of the mixing chamber 14, and then spills out into the mixing chamber 14 from the upper portion of the receiving chamber 26.

This can effectively restrain particles having a high specific gravity, bulky flocs, and the like from sedimenting within the mixing chamber 14 and thereby precipitating on the bottom of the rotary support 64 of the distributor 62 as compared with the case where the liquid is directly introduced into the mixing chamber 14 from the conduit 24. As a result, the inlets of discharge pipes 66 in the distributor 62 are kept from being blocked, so that the liquid is always efficiently distributed into the sedimentation space within the tank 12, whereby the operating performance of the sedimentation apparatus 10 improves.

With respect to the liquid having flowed into the mixing chamber 14 from the receiving chamber 26, an additive is injected at a given timing from any or all of the injection nozzles 42 disposed as being separated into a plurality of stages. Consequently, the effect caused by the additive continues for a long period of time, and flocs having a favorable sedimentation characteristic are formed. The liquid and the additive within the mixing chamber 14 are mixed by the mixer device 34, whereby suspended solids and the like in the liquid coagulate to form flocs (initial flocs).

The liquid containing the flocs enters the rotary support 64 driven to rotate by the driving device 56, and is distributed into the sedimentation tank 12 from the discharge orifices 68 of the discharge pipes 66. Here, one portion of the flow of the liquid descending from the mixing chamber 14 toward the rotary support 64, i.e. the flow about to enter the gap between the mixing chamber 14 and the rotary support 64 is blocked by the sealing unit 70. The liquid containing the coagulated flocs is evenly distributed into the sedimentation space within the tank 12 from the discharge orifices 68 of the discharge pipes 66. Also, since the increase in the liquid within the sedimentation space is collected by the annular troughs 96, 98 in the upper portion of the sedimentation tank 12, an upward flow of the liquid occurs within the tank 12, thereby forming a sludge blanket layer B above the distributor 62 in the case of sludge blanket type operation. Among the coagulated flocs in the liquid, those separated by sedimentation operation within the tank 12 form a concentrated sludge layer A in the bottom portion of the sedimentation tank 12 with the aid of the rake 86.

Within the mixing chamber 14, a part of particles, bulky flocs, and the like sediment, and precipitate on the bottom of the rotary support 64 without flowing into each discharge pipe 66. During the operation of the sedimentation apparatus 10, the rotary support 64 rotates relative to the mixing chamber 14, whereby the scraping blade 76 fixed to the mixing chamber 14 would rotate with respect to the rotary support 64. As a consequence, the precipitate deposited on the bottom surface of the rotary support 64 during the operation of the sedimentation apparatus 10 is scraped into the opening 74 by the scraping blade 76 and is discharged into the tank 12 by way of the opening 74.

As a result, sludge would not precipitate in excess on the bottom surface of the rotary support 64, so that troubles caused by the precipitate within the rotary support 64 such as the blocking of the inlets of discharge pipes 66 in the distributor 62 are kept from occurring, whereby the liquid to be treated is always efficiently distributed into the sedimentation tank 12. Consequently, the operating performance of the sedimentation apparatus 10 improves, and the clarity of supernatants also increases.

Also, the flow of the liquid flowing into the sedimentation space within the tank 12 from the mixing chamber 14 through the opening 74 is blocked by the shortcut preventing member 82 before reaching the concentrated sludge layer A formed below the rotary support 64. Similarly, not only the sludge, bulky flocs, and the like in the liquid flowing out of the opening 74, but also the precipitate, such as sludge, discharged into the sedimentation space from the opening 74 with the aid of the scraping blade 76 is held by the shortcut preventing member 82 disposed under the rotary support 64. Since the shortcut preventing member 82 rotates together with the rotary support 64, the precipitate on the shortcut preventing member 82 would sediment in the lower portion of the sedimentation tank 12 gradually and slowly under the action of centrifugal forces.

This prevents so-called shortcut phenomenon, in which the liquid flowing into the sedimentation space through the opening 74 directly reaches the concentrated sludge layer A, from occurring and the coagulated flocs and concentrated sludge layer A from being diluted or stirred by the precipitates discharged into the sedimentation tank 12 from the rotary support 64, whereby the clarity of supernatants can be maintained favorably.

The concentrated sludge is drained from the concentrated sludge layer A whenever necessary by the sludge drain pump 92 controlled according to the value indicated by the interface sensor not depicted, whereby the interface height of the sludge blanket layer B is held within a predetermined range. On the other hand, fine flocs in the upward flow are captured by large flocs in the sludge blanket layer B, so as to be eliminated from the upward flow.

The depicted sedimentation apparatus 10 comprises a swirl preventing member 102 formed like a rectangular sheet from a sheet material such as a vinyl-coated nylon sheet or cloth (see FIG. 1). The swirl preventing member 102 is spanned between the inner peripheral surface of the sedimentation tank 12 and the outer peripheral surface of the mixing chamber 14, so as to radially partition the inside of the sedimentation tank 12. Consequently, if a swirl occurs in the liquid within the sedimentation tank 12 as the distributor 62 rotates, the swirl will collide with the swirl preventing member 102 when ascending within the sedimentation tank 12. Therefore, fine coagulating flocs are restrained from rolling up in the region higher than the distributor 62 but lower than the clarified liquid surface within the sedimentation tank 12, whereby the floating particle concentration in supernatants can be lowered to a desirable level. Hence, very clear supernatants ascend within the sedimentation tank 12, thereby forming a clarified layer C. Then, the supernatants spill out as a treated liquid into the annular troughs 96, 98, and are finally taken out to the outside of the system by way of the flow outlet 100.

The configuration of the annular troughs 96, 98 will now be explained in detail. Each annular trough 96, 98 has a U-shaped cross section with an open upper portion, such that supernatants flow into the trough 96, 98 over the upper edge of its vertical part, i.e., weir part. As mentioned above, there are two annular troughs 96, 98 having larger and smaller diameters in this embodiment, which are disposed concentrically. The annular troughs 96, 98 are attached to the sedimentation tank 12 by a plurality of horizontal bars 104 radially extending between the mixing chamber 14 and the side wall 18 of the sedimentation tank 12. Also, the larger-diameter trough 96 and the smaller-diameter trough 98 are communicated to each other by a single U-shaped communicating flow path member 106 radially extending therebetween, whereas the outer end portion of the communicating flow path member 106 opens into the flow outlet 100. For smoothly introducing the collected liquid into the flow outlet 100, it is preferred that the depth of the communicating flow path member 106 be greater than the depth of the annular troughs 96, 98. The upper edge of the vertical part of the communicating flow path member 106 may have the same height as the upper edge of the weir part of the annular troughs 96, 98, so as to allow supernatants to spill out from this portion as well.

The larger-diameter annular trough 96 is disposed in a state in contact with the inner peripheral surface of the side wall 18 of the tank 12 as with conventional one. As a consequence, supernatants spill out therein only from the weir part 96*a* on the center side of the tank 12. In the depicted embodiment, since the annular trough 96 employs the side wall 18 as its constituent element, the trough itself has an L-shaped form. On the other hand, the smaller-diameter annular trough 98 is disposed at a predetermined position between the mixing chamber 14 and the side wall 18 of the sedimentation tank 12, whereby supernatants spill out therein from both weir parts 98*a*, 98*b* on the center side and outer side of the tank 12.

Though the upper edges of the weir parts 96*a*, 98*a*, 98*b* into which supernatants spill out may be made linear, it is preferred that V-shaped notches be arranged in the upper edges of the weir parts 96*a*, 98*a*, 98*b* at equally spaced intervals, since it is difficult for the troughs 96, 98 in total to be arranged horizontally with a high accuracy. As a consequence, if the notch size is adjusted, then supernatants can be evenly spilled out into the whole periphery of the annular trough 96, 98.

When one annular trough 98 is additionally disposed inside the outer annular trough 96 as such, then the upward flow in the vicinity of the side wall 18 of the sedimentation tank 12 is kept from becoming faster than the upward flow on the center side of the sedimentation tank 12. Namely, supernatants also flow into the annular trough 98 installed on the center side of the tank 12, so that the flow rate of the upward flow on the center side of the sedimentation tank 12 approximates the flow rate of the upward flow in the vicinity of the side wall 18 of the sedimentation tank 12, thereby yielding more even upward flows in total.

The optimal positions and widths of annular troughs 96, 98 will now be explained. First, letting the amount of inflow per apparatus length in the circumferential direction of each of the weir parts 96a, 98a, 98b of the annular troughs 96, 98 be referred to as weir overflow load, it is presumed that upward flows within the sedimentation tank 12 become the most uniform if the weir overflow load is the same in the individual weir parts 96a, 98a, 98b.

Here, letting $D_1$ be the inside diameter of the side wall 18 of the sedimentation tank 12, $D_2$ be the diameter of the inner weir part 96a of the larger-diameter annular trough 96, $D_3$ and $D_4$ be the outer weir part 98b and inner weir part 98a of the smaller-diameter annular trough 98, and $R_1$ be the outside diameter of the mixing chamber, the optimal relationship mentioned above can be represented by the following expression.

$$\frac{\pi\{D_1^2 - [(D_2+D_3)/2]^2\}}{\pi D_2} = \frac{\pi\{[(D_2+D_3)/2]^2 - [(D_3+D_4)/2]^2\}}{\pi D_3}$$
$$= \frac{\pi\{[(D_3+D_4)/2]^2 - R_1^2\}}{\pi D_4}$$

As a matter of course, $(D_1-D_2)/2$ and $(D_3-D_4)/2$ represent the respective groove widths of the annular troughs 96, 98.

When the annular troughs 96, 98 are arranged and configured so as to satisfy such a relationship, the upward flows within the sedimentation tank 12 become more even, so as to improve the effect of separation by sedimentation, whereby very clear supernatants can be collected.

Though a preferred embodiment of the present invention has been explained in detail in the foregoing, the present invention is not restricted to the above-mentioned embodiment as a matter of course.

Figure 7:
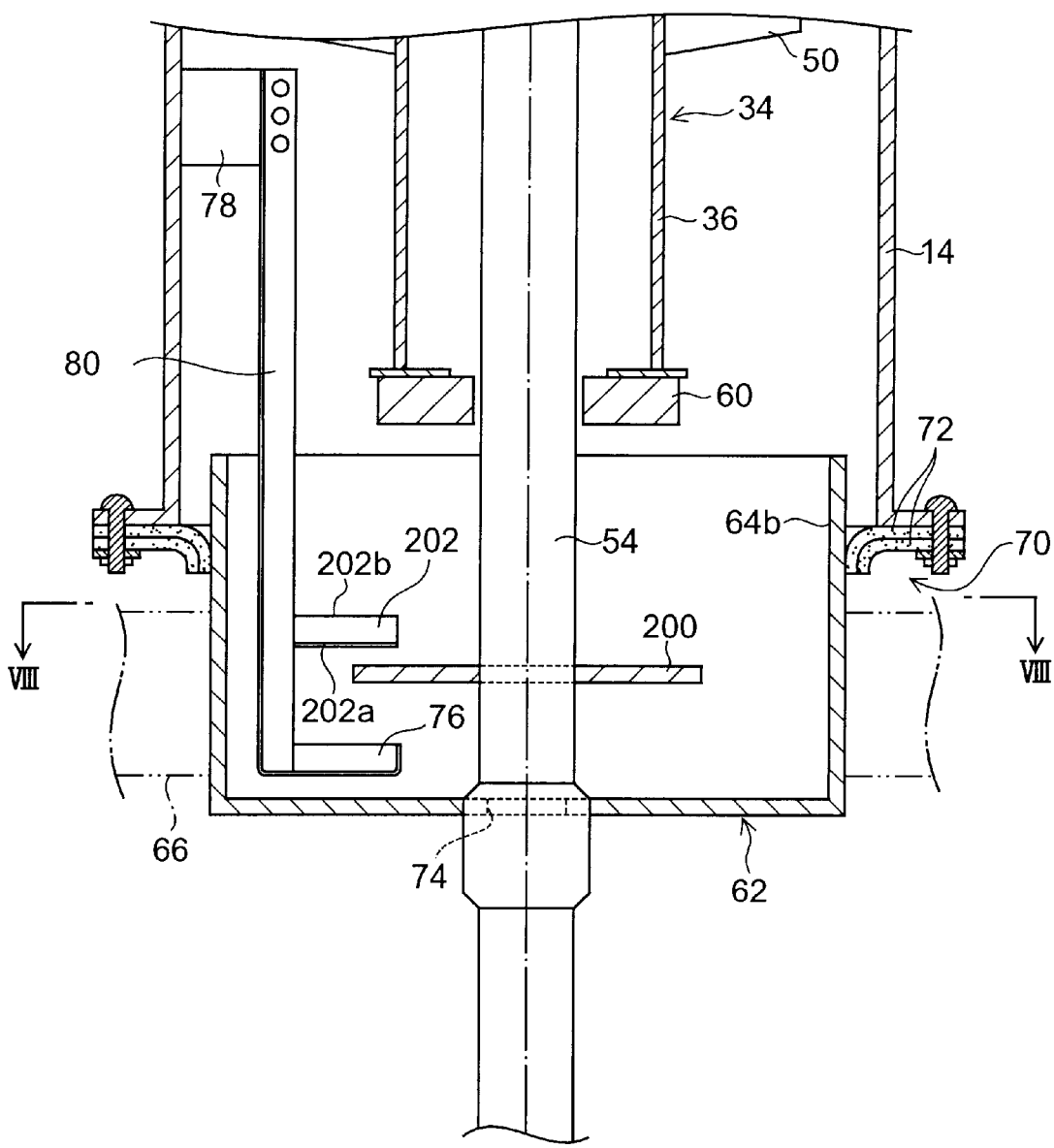
FIG. 7 is an enlarged partial sectional view showing the vicinity of a connecting part between the mixing chamber and rotary support in another embodiment in accordance with the present invention.
Figure 8:
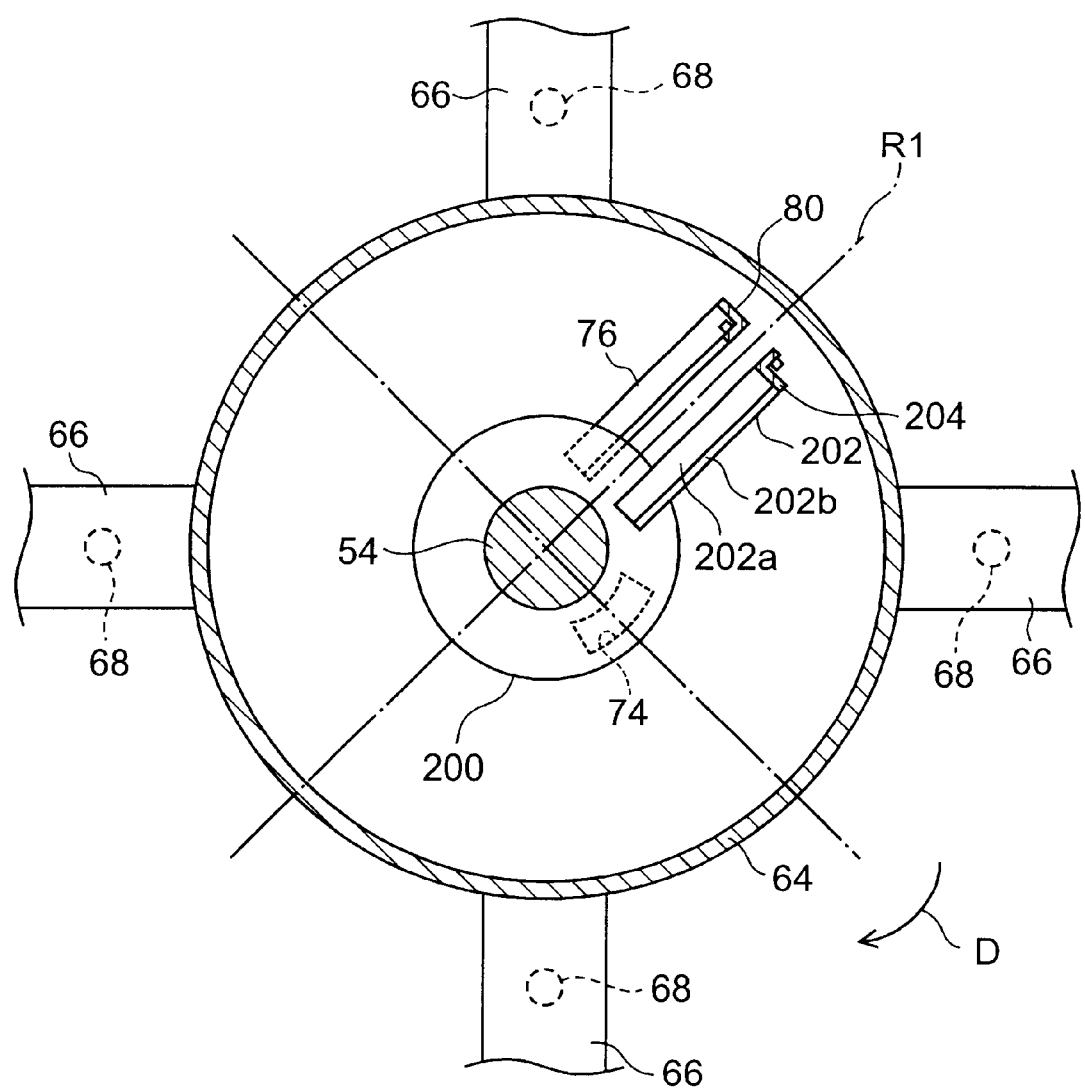
FIG. 8 is a sectional view taken along the line VIII—VIII in FIG. 7.

For example, a shortcut preventing member may be disposed within the rotary support 64. Namely, in the embodiment shown in FIGS. 7 and 8, a shortcut preventing member 200 is fixed to the center shaft 54 so as to be positioned above the opening 74 formed in the bottom part of the rotary support 64. As a consequence, the flow of the liquid directed to the opening 74 within the mixing chamber 14 is blocked by the shortcut preventing member 200 disposed above the opening 74. This resultantly prevents so-called shortcut phenomenon, in which the liquid flowing into the sedimentation tank 12 through the opening 74 directly reaches the concentrated sludge layer or the like, from occurring and the coagulated flocs and concentrated sludge layer from being diluted or stirred by the precipitate and the like discharged into the sedimentation tank 12 from the rotary support 64, whereby the clarity of supernatants can be maintained favorably.

By the way, sludge, bulky flocs, and the like may deposit on the shortcut preventing member 200 disposed above the opening 74. In view of this, it is preferred that a brushing blade 202 for brushing off the precipitate deposited on the shortcut preventing member 200 be provided. Namely, the upper end of a support member 204 formed from an angle steel or the like is fixed by means of a bolt or the like to the attachment block 78 secured to the inner peripheral face of the mixing chamber 14. Across the attachment block 78, the support member 204 faces the support member 80 supporting the scraping blade 76; and extends parallel to the center shaft 54, i.e., vertically.

The brushing blade 202 is preferably made of an angle material and has substantially an L-shaped cross section. The brushing blade 202 is fixed to the lower end part of the support member 204, whereas its vertically disposed one planer part 202b is located on the front side in the normal rotating direction D of the rotary support 64. Preferably, the distance between the horizontal planar part 202a of the brushing blade 202 and the upper face of the shortcut preventing member 200 is set to about 1 to 50 mm.

Now, when a line which is substantially parallel to the brushing blade 202 and radially extends from the center of the center shaft 54 is set as a specific radius R1 with respect to the rotary support 64, the brushing blade 202 as a whole is arranged so as to be positioned on the normal direction side of the rotary support 64 from the radius R1. Since the brushing blade 202 is arranged as such, a centrifugal force (directed to the inner peripheral face of the mixing chamber 14) would act on the precipitate in contact with the vertical planar part 202b of the brushing blade 202. As a consequence, if the brushing blade 202 rotates with respect to the rotary support 64, then the precipitate will be scraped by the brushing blade 202 toward the inner peripheral face of the mixing chamber 14.

During the operation of the sedimentation apparatus, the shortcut preventing member 200 fixed to the center shaft 54 rotates together with the rotary support 64, whereby the brushing blade 202 secured to the mixing chamber 14 rotates with respect to the shortcut preventing member 200. As a consequence, the precipitate deposited on the shortcut preventing member 200 is brushed off by the brushing blade 202, so as to flow into the individual discharge pipes 66. Also, the precipitate brushed off by the brushing blade 202 so as to be deposited at the bottom surface of the rotary support 64 is scraped into the opening 74 by the scraping blade 76 and then is discharged into the sedimentation tank 12 by way of the opening 74. It can easily be understood that the amount of discharge from the opening 74 is quite small due to the existence of the shortcut preventing member 200 and brushing blade 202.

Though the scraping blade 76 is constituted by a single piece of angle steel in the above-mentioned embodiments, its number, form, and attaching position are not limited to those in the above-mentioned embodiments.

Though only two annular troughs 96, 98 are provided in the above-mentioned embodiments, three or more annular troughs may be disposed concentrically in a large tank. It is also preferred in this case that the sizes and positioning of the individual annular troughs be determined such that their weir parts yield an identical weir overflow load.

Further, though both of the above-mentioned annular troughs have a circular form, they may be shaped like a polygon such as hexagon or octagon in order to facilitate their manufacture. In this case, it will be sufficient if the above-mentioned equation is calculated in terms of their average sizes.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A coagulating sedimentation apparatus for precipitating and separating suspended solids, coagulated flocs or the like in a liquid to be treated, so as to clarify said liquid, said sedimentation apparatus comprising:

a sedimentation tank;

a mixing chamber vertically disposed within said tank concentrically therewith, for introducing and mixing said liquid and an additive therein;

a cup-shaped rotary support disposed adjacent a lower end of said mixing chamber so as to act as a bottom of said mixing chamber, said rotary support being rotated about a center axis of said mixing chamber and having a bottom portion formed with an opening;

a discharge pipe extending outward from an outer peripheral surface of said rotary support, communicating with the inside of said rotary support, and having a tubular wall provided with a discharge orifice, said discharge pipe being for distributing said liquid from said mixing chamber into a sedimentation space between said tank and said mixing chamber; and a blade fixed with respect to said mixing chamber and adapted to discharge a precipitate deposited on the bottom portion of said rotary support from said opening to the outside of said rotary support.

2. A coagulating sedimentation apparatus according to claim 1, further comprising:

a mixer device disposed within said mixing chamber and adapted to rotate about the center axis of said mixing chamber, for mixing and stirring said liquid and additive; and a center shaft disposed so as to penetrate through said mixer device and adapted to rotate about the center axis of said mixing chamber, said rotary support fixed to said center shaft.

3. A coagulating sedimentation apparatus according to claim 1, further comprising a shortcut preventing member disposed under said opening and adapted to rotate together with said rotary support, for blocking a flow of said liquid flowing out through said opening from said mixing chamber and rotary support.

4. A coagulating sedimentation apparatus according to claim 1, further comprising:

a shortcut preventing member disposed above said opening and adapted to rotate together with said rotary support, for blocking a flow of said liquid directed from said mixing chamber toward said opening; and a blade fixed with respect to said mixing chamber, for brushing off a precipitate deposited on said shortcut preventing member.

5. A coagulating sedimentation apparatus according to claim 1, further comprising:

a conduit connected to said mixing chamber, for introducing said liquid into said mixing chamber; and a receiving chamber formed along an inner peripheral surface of said mixing chamber, for receiving said liquid from said conduit and causing said liquid to flow from said receiving chamber into said mixing chamber.

6. A coagulating sedimentation apparatus according to claim 5, wherein said receiving chamber is defined by the inner peripheral surface of said mixing chamber, an annular member fixed to the inner peripheral face of said mixing chamber, and a tubular member fixed to an inner edge of said annular member.

7. A coagulating sedimentation apparatus according to claim 6, wherein said annular member is positioned lower than said conduit, and wherein said tubular member has an upper edge positioned higher than said conduit.

8. A coagulating sedimentation apparatus according to claim 5, wherein said receiving chamber has a bottom portion formed with a discharge port for discharging a precipitate deposited within said receiving chamber.

9. A coagulating sedimentation apparatus according to claim 8, wherein said discharge port has a total area which is ¼ to ½ of the area of the bottom surface of said receiving chamber.

10. A coagulating sedimentation apparatus according to claim 1, further comprising a plurality of annular troughs concentrically arranged in an upper portion of said tank.

11. A coagulating sedimentation apparatus according to claim 10, wherein said plurality of annular troughs are positioned and dimensioned such that weir parts of all said plurality of annular troughs into which a supernatant in said sedimentation space within said tank spills out have a substantially identical overflow liquid load.

12. A coagulating sedimentation apparatus according to claim 10, wherein said plurality of annular troughs comprise an annular trough with a larger diameter disposed along a side wall of said tank, and an annular trough with a smaller diameter disposed in an intermediate portion between said side wall of said tank and said mixing chamber.

13. A coagulating sedimentation apparatus according to claim 12, wherein said plurality of annular troughs are positioned and dimensioned so as to satisfy the following expression:

$$\frac{\pi\{D_1^2 - [(D_2 + D_3)/2]^2\}}{\pi D_2} = \frac{\pi\{[(D_2 + D_3)/2]^2 - [(D_3 + D_4)/2]^2\}}{\pi D_3}$$
$$= \frac{\pi\{[(D_3 + D_4)/2]^2 - R_1^2\}}{\pi D_4}$$

where $D_1$ is the inside diameter of the side wall of the tank, $D_2$ is the inside diameter of the inner weir part of the annular trough with a larger diameter, $D_3$ is the outside diameter of the outer weir part of the annular trough with a smaller diameter, and $D_4$ is the inside diameter of the inner weir part of the annular trough with a smaller diameter, and $R_1$ is the outside diameter of the mixing chamber.

14. A coagulating sedimentation apparatus according to claim 1, further comprising a member secured to a mixer device, for supporting a center shaft.

* * * * *